Sept. 23, 1958 K. T. WILSON 2,853,345
FLEXIBLE JOURNAL BEARING AND SEAL FOR ROTATABLE MEMBERS
Filed Dec. 16, 1955
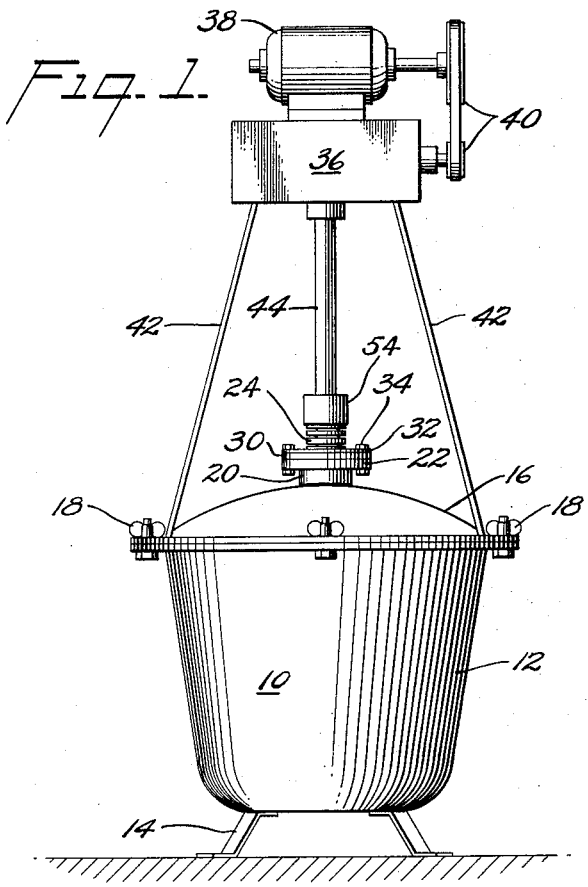
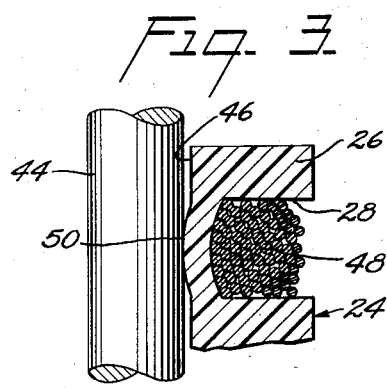
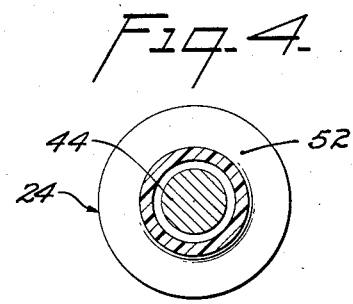
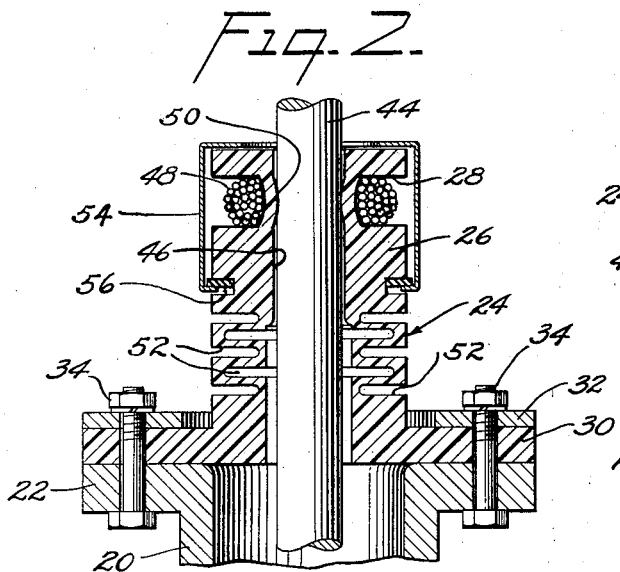
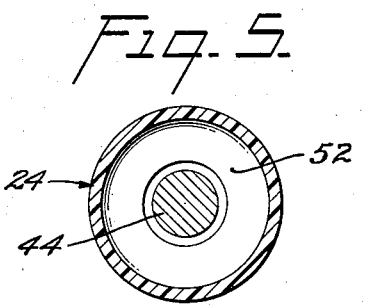
INVENTOR.
KENNETH T. WILSON
BY
ATTORNEY

United States Patent Office 2,853,345
Patented Sept. 23, 1958

2,853,345

FLEXIBLE JOURNAL BEARING AND SEAL FOR ROTATABLE MEMBERS

Kenneth T. Wilson, Roseland, N. J.

Application December 16, 1955, Serial No. 553,534

7 Claims. (Cl. 308—36.1)

The invention relates to bearing seals for rotary shafts and more particularly to a self-supporting, yieldable bearing structure in which a portion thereaof is adapted to be constricted circumferentially into bearing seal engagement with the periphery of a rotatable shaft by means of an elastic strand in coactable relation therewith.

The invention has particular reference to a yieldable, non-metallic self-supporting bearing structure comprising a flanged bearing sleeve provided with an annular groove about said sleeve, and a pre-stressed, resilient strand means disposed in said annular groove in multiple layer formation, whereby a predetermined portion of the bearing sleeve is adapted to form an annular "line bearing seal" on and about the entire periphery of a rotatable shaft when journaled in said bearing structure.

In the manufacture of pharmaceuticals, large process or "Pfaudler" kettles are utilized in which various processes are carried out under a predetermined vacuum or pressure which must be maintained at a constant value during such processes. Inasmuch as such process kettles include a closure member or lid provided with an upstanding journal bearing centrally thereof for receiving a rotatable shaft therethrough, such journal bearings must be provided with a bearing seal to prevent leakage of a vacuum or pressure in such process kettles between the journal bearing and shaft.

In journal bearing structures as provided heretofore in process kettles of the character aforesaid, various forms of bearing sealing means, as for example, packing rings including coiled spring biasing means were utilized. However, bearing seals of this character were subject to certain disadvantages in that such devices were not adapted to compensate for non-concentric rotation of a shaft journaled in such bearing structures without producing excessive wear in the journal bearing, and were not completely effective in sealing the bearing about the entire circumference of the shaft against axial leakage therebetween.

Accordingly, it is an object of the invention to provide a coactable journal bearing and sealing means for journaling a rotatable shaft in conventional process kettles as aforesaid, which is self-lubricating, self-supporting, self-aligning and adapted for maintaining an effective vacuum of pressure seal about the entire circumference of the rotatable shaft.

A further object of the invention is to provide an improved journal seal bearing structure of the character described which is adapted to present a minimum bearing surface in substantial line contact about the entire circumference of a rotatable shaft.

Another object of the invention is to provide a flexible, non-metallic, self-supporting journal seal bearing structure of the character described which is adapted to be secured directly on the closure member of a conventional process kettle in axial alignment therewith for receiving a rotatable shaft therethrough in bearing seal relation.

A further object of the invention is to provide an improved flexible bearing seal structure for rotary shafts which is inherently capable of being biased into circumferential bearing seal engagement therewith by means of an elastic strand means pre-stressed about a reduced diametral portion of said bearing structure.

Another object of the invention is to provide a flexible, non-metallic, unitary bearing structure, including an elastic linear means as a component part thereof, for journaling a rotatable shaft forming a part of process kettles as aforesaid, wherein the elastic means coacts with the bearing sleeve to provide a cumulative annular pressure on and about the entire circumference of the bearing sleeve for engagement with the rotatable shaft while permitting free relative rotation thereof and flexing of the bearing structure in response to rotational inaccuracies of the shaft without impairing the bearing sleeve or the efficiency of the sealed bearing surface maintained therebetween by said elastic means.

A further object of the invention is to provide a journal bearing structure comprising a base flange and a relatively yieldable bearing sleeve including an elastic sealing means therefor wherein the bearing sleeve, within its bore, presents a narrow, ring-like, substantially convex bearing surface to the periphery of a shaft, when rotatably journaled therein, in response to a cumulative constrictive force applied to a portion of said bearing sleeve by said elastic means, whereby a highly effective "annular line seal" is maintained on and about the entire periphery of the rotatable shaft, the bore in said bearing sleeve being larger than the diameter of said shaft adjacent each end of said "line seal," whereby orbital inaccuracies in shaft rotation are compensated for by flexing of the bearing sleeve without impairing the seal between a portion thereof and the shaft.

Other objects and advantages of the invention will be set forth in part hereinafter and in part will be obvious herefrom, the same being realized and attained by means of the improvements and combinations pointed out in the appended claims.

The accompanying drawing constituting a part hereof illustrates one embodiment of the invention and, together with the ensuing description, serves to explain the principles thereof.

In the drawing:

Fig. 1 is an elevational view of a conventional process kettle including a motor and a reduction gear drive, showing the invention as applied thereto;

Fig. 2 is a fragmentary vertical sectional view through the improved bearing seal as constructed in accordance with the invention and showing a rotatable shaft as journaled therethrough;

Fig. 3 is an enlarged fragmentary detail view partly in section, showing an elastic linear means in coactable relation with a portion of a flanged bearing sleeve constructed in accordance with the invention;

Fig. 4 is a cross sectional view taken on the line 4—4 of Fig. 2; and

Fig. 5 is a cross sectional view taken on the line 5—5 of Fig. 2.

Referring to the drawing, Fig. 1 illustrates a conventional process kettle 10, as utilized in the manufacture of pharmaceutical preparations and the like, for example, which comprises a tank-like container 12 provided with suitable leg supports 14, and a concavo-convex closure member or lid 16, adapted to be secured on the container 12, in air-tight relation, by suitable hand-screw means indicated at 18. The closure lid 16 is provided centrally thereof with an integral, upstanding spacing sleeve 20 having an annular flange 22 about its uppermost end for a purpose now to be described.

In accordance with the invention, a flexible, self-supporting journal bearing 24 formed of a polytetrafluorethylene polymer plastic material, commonly known by the trademark "Teflon," comprises a bearing sleeve 26, provided with an annular channel or groove 28 adjacent one end thereof, and its opposite end terminating in an annular flange 30 integral therewith, is secured on the flange 22 of the spacing sleeve 20, by means of a suitable metallic ring 32 and a plurality of suitable screw bolts 34 in sealed relation with the closure lid 16, as clearly shown in Figs. 1 and 2.

A reduction gear unit 36, mounting an electric motor 38, drivably connected thereto by means of a pair of belt-connected pulleys 40, in known manner, is supported above the closure lid 16 by means of a plurality of angularly spaced supports or stays 42, connected to and between the closure lid 16 and the reduction gear unit 36, as shown in Fig. 1, a rotatable shaft 44 depending from the reduction gear unit 36 in axial alignment with and extending through the journal bearing 24, with its lowermost end within the container tank 12, fitted with a known form of agitator or mixing paddle, not shown, in approved manner.

Further, in accordance with the invention and as shown in Fig. 2, the journal bearing 24 is provided with a bore 46, which is substantially larger than the diameter of the rotatable shaft 44, for a purpose hereinafter described. A bearing seal is established between the annularly grooved portion of the bearing sleeve 26, and the shaft 44, by means of a suitable length of elastic strand or filament 48 of rubber, rubber-like material, stretchable nylon or equivalent elastic material which is pre-stressed as it is wrapped down in the annular groove 28 in successive superimposed convolutions, as clearly shown in Fig. 3, whereby the flat bottom or floor 50 of the annular groove 28 is biased or distended substantially into concavo-convex form by the cumulative constrictive force of the elastic strand 48 into annular bearing seal engagement with the entire circumference of the rotatable shaft 44. Thus, since the bore 46 of the journal bearing 24, extending in opposite directions from each side of the bearing seal 50, remains substantially larger than the diameter of the shaft 44, it will be readily apparent that any rotational irregularities of that portion of the shaft extending through the bearing sleeve 24, will simply flex the free upstanding end portion 26 thereof out of axial alignment with respect to the axial center of the closure lid 16 without impairing the bearing seal maintained on the shaft 44 by a portion of the bearing sleeve 24 in response to the convoluted elastic strand 48.

Further, in accordance with the invention and as clearly shown in Fig. 2, the upstanding portion 26 of the bearing 24 is provided between its annular flange 30 and the annular groove 28 with a plurality of axially spaced, alternating internal and external relatively narrow annular grooves 52 formed to a depth sufficient to facilitate flexing of the upstanding portion 26 of the bearing sleeve 24 out of normal axial alignment relative to its base flange 30, in response to any rotational irregularities of the journaled portion of the shaft 44.

Further, in accordance with the invention and as shown in Fig. 2, the uppermost end portion of the bearing sleeve 24 is provided with a light metal protective cap 54, having a clearance opening in one end for the shaft 44, which is suitably spun at its opposite end into locking engagement with a relatively small annular groove 56, formed in the free end portion of the bearing sleeve 24, sufficiently below the elastic strand loaded annular groove 28.

From the foregoing it is readily apparent that the invention provides an improved, self-supporting bearing seal which may be connected to a process kettle, pump, reactor or any similar device, in a plane normal to its running seal. Moreover, the invention provides a highly desirable rotary bearing seal for all kinds of laboratory apparatus in which it is highly essential that there be no leakage either into or out of the apparatus, and, inasmuch as Teflon is an excellent, long lasting, self-lubricating plastic material, the invention provides for the first time a bearing seal which is highly efficient, reliable and economical in the maintenance thereof.

While the invention has been illustrated and described with respect to a preferred embodiment thereof, it is to be expressly understood that various changes and modifications may be made therein without departing from the inventive concept underlying the same. Therefore, the invention is not to be limited except as is necessitated by the prior art and the scope of the appended claims.

What is claimed is:

1. A journal bearing formed of "Teflon" comprising a bearing sleeve having a straight bore therethrough, an annular supporting flange integral with one end of said bearing sleeve, a series of narrow internal and external annular grooves formed in said sleeve adjacent said flange to permit flexing of said sleeve relative to said flange, a relatively large annular groove formed in the outer periphery of said sleeve adjacent the opposite free end thereof, a linear strand of pre-stressed elastic material convoluted on and about the bottom of said annular groove to impart a cumulative constrictive force thereon to reduce the initial diameter of the bore in said sleeve substantially in the plane of said annular groove, and a cup-like cover member spun on the grooved free end portion of said bearing sleeve.

2. A plastic journal bearing comprising a bearing sleeve having a straight bore therethrough, an annular supporting flange integral with one end of said bearing sleeve, said sleeve having an annular groove in the outer periphery and adjacent the opposite free end thereof, a pre-stressed annulus of elastic material disposed on and about the bottom of said annular groove to exert a constrictive force thereon to reduce the initial diameter of said sleeve bore in the plane of said annulus, said sleeve having an indentation in the periphery thereof between said groove and said supporting flange, and a cup-like cover member having a portion disposed in locking engagement in said indentation and enclosing said groove.

3. A journal bearing as claimed in claim 2, in which the material of said bearing is "Teflon."

4. A journal bearing as claimed in claim 2, in which said pre-stressed annulus of elastic material is in the form of a linear strand having a plurality of convolutions.

5. A journal bearing as claimed in claim 2, said sleeve having a plurality of internal and external annular grooves between the flange and the groove which contains the annulus, to permit flexing of the sleeve relative to the flange.

6. A journal bearing as claimed in claim 2, in which said indentation comprises an annular groove and said portion of the cup-like cover member comprises an end of the cover member spun into the last named groove.

7. In combination, a process kettle including a rotary shaft, a flanged spacing sleeve mounted in the center of a closure member secured on said kettle and receiving said shaft freely therethrough, a journal bearing for said shaft mounted on said spacing sleeve comprising a molded plastic structure defining a base flange and an upstanding bearing sleeve, said bearing sleeve being provided with an annular groove adjacent its free end defining a reduced diametral portion having a pre-stressed elastic strand convoluted thereabout whereby the reduced portion of said sleeve is circumferentially constricted into intimate bearing seal engagement with the entire circumference of said shaft, a cup-like cover spun on the grooved free end portion of said bearing sleeve, and a series of internal and external relatively narrow annular grooves formed in said sleeve adjacent its base flange whereby said sleeve is adapted to flex in response to rotational irregularities of said shaft without impairing said bearing seal.

(References on following page)

References Cited in the file of this patent

UNITED STATES PATENTS

| | | |
|---|---|---|
| 2,615,763 | Wolford | Oct. 28, 1952 |
| 2,622,949 | Cotchett | Dec. 23, 1952 |
| 2,690,360 | Young | Sept. 28, 1954 |
| 2,746,781 | Jones | May 22, 1956 |

FOREIGN PATENTS

| | | |
|---|---|---|
| 657,592 | Great Britain | Sept. 19, 1951 |

OTHER REFERENCES

"Automotive Industries," September 1, 1954, pages 107 and 108 relied upon.